(12) United States Patent
Lu

(10) Patent No.: US 11,500,776 B2
(45) Date of Patent: Nov. 15, 2022

(54) DATA WRITE SYSTEM AND METHOD WITH REGISTERS DEFINING ADDRESS RANGE

(71) Applicant: Realtek Semiconductor Corporation, Hsinchu (CN)

(72) Inventor: Yen-Ju Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 4 days.

(21) Appl. No.: 17/189,524

(22) Filed: Mar. 2, 2021

(65) Prior Publication Data
US 2021/0279173 A1    Sep. 9, 2021

(30) Foreign Application Priority Data

Mar. 3, 2020   (TW) ................................ 109106958

(51) Int. Cl.
| | | |
|---|---|---|
| *G06F 12/08* | (2016.01) | |
| *G06F 12/084* | (2016.01) | |
| *G06F 12/0882* | (2016.01) | |
| *G06F 9/30* | (2018.01) | |
| *G06F 12/02* | (2006.01) | |

(52) U.S. Cl.
CPC ........ *G06F 12/084* (2013.01); *G06F 9/30101* (2013.01); *G06F 12/0246* (2013.01); *G06F 12/0882* (2013.01); *G06F 2212/1021* (2013.01)

(58) Field of Classification Search
None
See application file for complete search history.

(56) References Cited

U.S. PATENT DOCUMENTS

2019/0324912 A1 * 10/2019 Toivanen ............... G06F 12/084

FOREIGN PATENT DOCUMENTS

| EP | 1612683 A2 * | 1/2006 | ........... G06F 12/084 |
|---|---|---|---|
| TW | 243509 B | 3/1995 | |
| TW | 201801088 A | 1/2018 | |

OTHER PUBLICATIONS

David A. Patterson et al., "Computer Organization and Design RISC-V Edition: The Hardware Software Interface", Apr. 13, 2017, Chapter 5.3, pp. 375-pp. 390.
Nor Flash In-Chip Execution (XIP), retrieved from https://blog.csdn.net/u012351051/article/details/81034661, Jul. 13, 2018.
Wikipedia , "Random-access memory", retrieved from https://en.wikipedia.org/wiki/Random-access_memory, Feb. 4, 2021.

* cited by examiner

*Primary Examiner* — Kevin Verbrugge
(74) *Attorney, Agent, or Firm* — Locke Lord LLP; Tim Tingkang Xia, Esq.

(57) ABSTRACT

A data write system includes a processor circuit, a first memory, at least one register, and a second memory. The first memory is coupled to the processor circuit. The at least one register is configured to define at least one range. The second memory is coupled to the first memory. If a cache miss occurs and an access address of a reading command is in the at least one range in the second memory, a predetermined amount of data corresponding to the access address is written from the second memory into at least one first way of the first memory.

18 Claims, 3 Drawing Sheets

US 11,500,776 B2

DATA WRITE SYSTEM AND METHOD WITH REGISTERS DEFINING ADDRESS RANGE

RELATED APPLICATIONS

This application claims priority to Taiwanese Application Serial Number 109106958, filed Mar. 3, 2020, which is herein incorporated by reference.

BACKGROUND

Technical Field

The present disclosure relates to a cache technology. More particularly, the present disclosure relates to a data write system and a data write method suitable for cache memories.

Description of Related Art

In memory technology, a cache memory can work coordination with a main memory to store data. Compared to the main memory, the operation speed of the cache memory is faster. Accordingly, operation efficiency of the entire system can be increased by utilizing the cache memory.

However, it is an important issue in this field that how to reduce cost or reduce an area of a circuitry in a situation that the cache memory is disposed in the system.

SUMMARY

Some aspects of the present disclosure are to provide a data write system. The data write system includes a processor circuit, a first memory, at least one register, and a second memory. The first memory is coupled to the processor circuit. The at least one register is configured to define at least one range. The second memory is coupled to the first memory. If a cache miss occurs and an access address of a reading command is in the at least one range in the second memory, a predetermined amount of data corresponding to the access address is written from the second memory into at least one first way of the first memory.

Some aspects of the present disclosure are to provide a data write method. The data write method includes following steps: determining whether a cache miss occurs and whether an access address of a reading command is in at least one range in a first memory; and if yes, a predetermined amount of data corresponding to the access address is written from the first memory into at least one first way of a second memory. The at least one range is defined by at least one register.

As shown in the above embodiments, the data write system and the data write method of the present disclosure do not need to dispose other memory (for example, dynamic random access memory), and thus can reduce cost and the circuit area.

DETAILED DESCRIPTION

Figure 1:
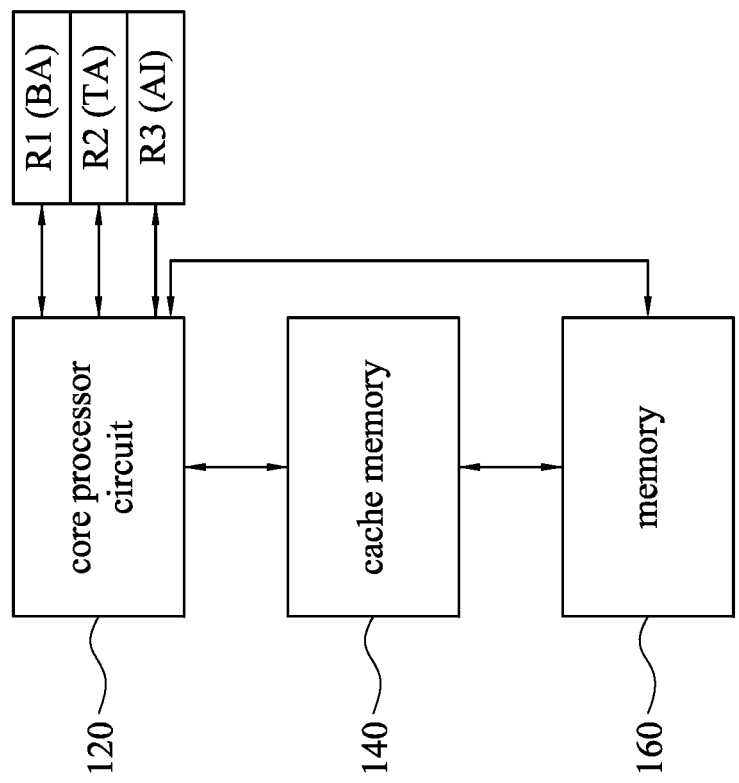
FIG. 1 is a schematic diagram of a data write system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram of a data write system 100 according to some embodiments of the present disclosure. As illustrated in FIG. 1, the data write system 100 includes a core processor circuit 120, a cache memory 140, a memory 160, and registers R1-R3.

In some embodiments, the memory 160 is implemented by a NAND flash memory. Since the price of the NAND flash memory is lower, cost of the data write system 100 is lower by utilizing the NAND flash memory.

The registers R1-R3 are coupled to the core processor circuit 120 respectively. The core processor circuit 120 is coupled to the cache memory 140 and the memory 160. The cache memory 140 is coupled to the memory 160.

The operation speed of the cache memory 140 is faster. Accordingly, for increasing the operation efficiency of the system, when the core processor circuit 120 receives a reading command, the core processor circuit 120 reads the cache memory 140 first. However, if the data to be read is not in the cache memory 140 and the data to be read is in the memory 160, the core processor circuit 120 receives the data from the memory 160 directly. At the same time, the data to be read is written from the memory 160 into the cache memory 140, such that the core processor circuit 120 can read the data from the cache memory 140 in the future.

In some embodiments, the register R1 is configured to store base address information BA, and the register R2 is configured to store top address information TA. The base address information BA and the top address information TA can define a range in the memory 160. In some embodiments, the register R1 is configured to store start address information, and the register R2 is configured to store size information. The start address information and the size information can define a range in the memory 160. In some other embodiments, the data write system 100 may include multiple registers R1 and multiple registers R2, to define two or more than two ranges.

Figure 2:
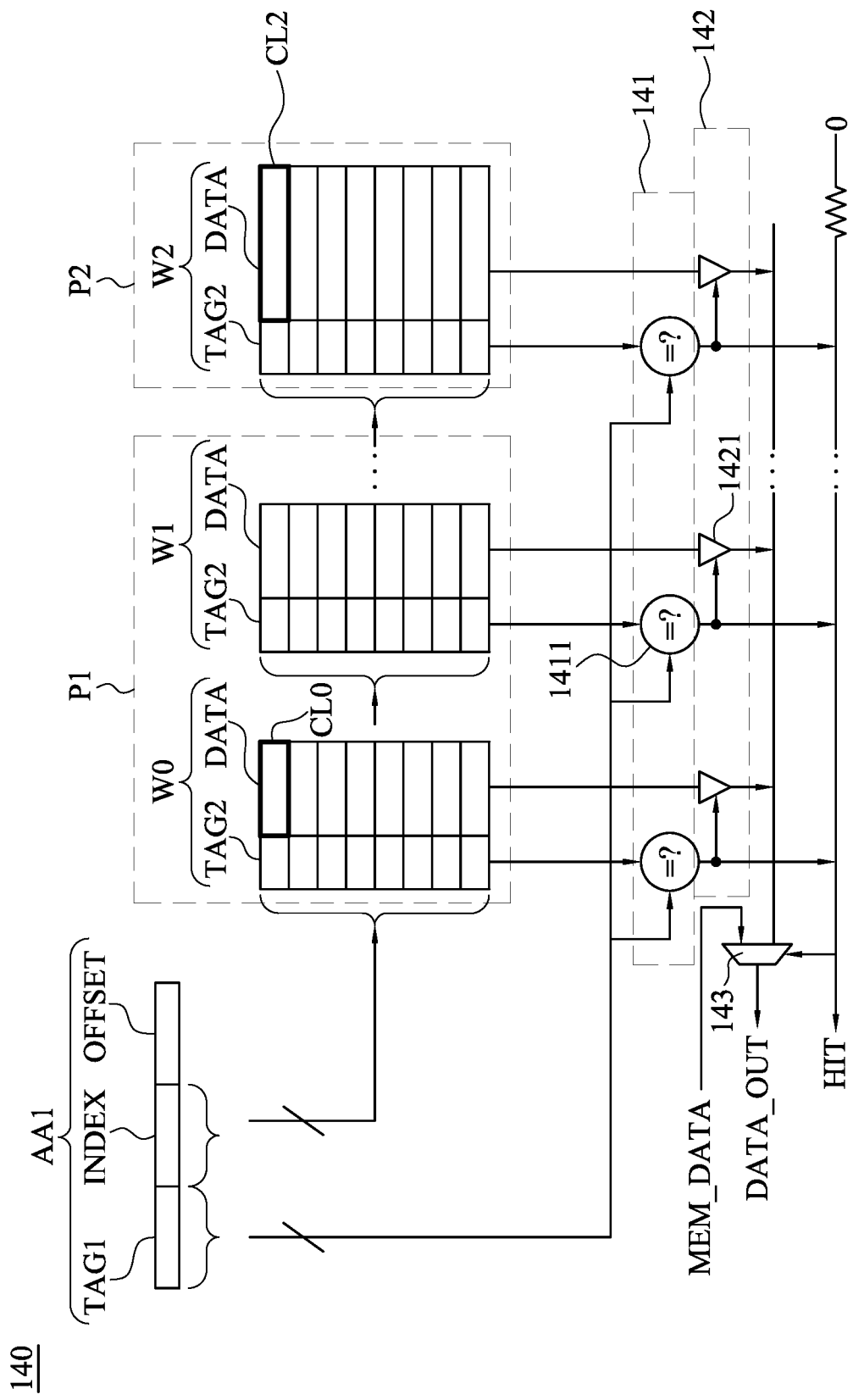
FIG. 2 is a schematic diagram of a cache memory according to some embodiments of the present disclosure.

References are made to FIG. 1 and FIG. 2. FIG. 2 is a schematic diagram of the cache memory 140 according to some embodiments of the present disclosure.

As illustrated in FIG. 2, the cache memory 140 includes multiple ways W0-W2. The quantity of the ways is merely for illustration, and various quantities of the ways are within contemplated scopes of the present disclosure. For example, the quantity of the cache memory 140 may be smaller than or larger than 3. If the quantity of the cache memory 140 is larger than 1, it can prevent data from changing rapidly (for example, data is replaced by another data rapidly), to increase the cache hit rate.

The register R3 is configured to store assigning information AI. The assigning information AI is configured to record a quantity of ways of a first portion P1 in the cache memory 140 and a quantity of ways of a second portion P2 in the cache memory 140. The ways of the first portion P1 is configured to store data from the memory 160, and the ways of the second portion P2 is configured to store data from a static random access memory (SRAM). In other words, the data from the memory 160 and the data from the data from the static random access memory are stored into different ways.

As illustrate in FIG. 2, the first portion P1 includes a way W0 and a way W1. The second portion P2 includes a way W2. In other words, a quantity of ways for storing the data from the memory 160 is 2 (for example, the way W0 and the way W1), and a quantity of ways for storing the data from the static random access memory is 1 (for example, the way W2). The quantity of the ways of the first portion P1 and the quantity of the ways of the second portion P2 are merely for illustration, and various quantities are within contemplated scopes of the present disclosure. For example, the quantity of the ways of the first portion P1 may be smaller than or larger than 2, and the quantity of the ways of the second portion P2 may be larger than 1.

In some embodiments, a capacity of a cache line in the way W0 (or the way W1) is different from a capacity of a cache line in the way W2. As illustrated in FIG. 2, a capacity of a cache line CL0 in the way W0 is smaller than a capacity of a cache line CL2 in the way W2. In some other embodiments, a capacity of a cache line in the way W0 (or the way W1) may be the same to a capacity of a cache line in the way W2. A capacity of a cache line is also referred to a cache line size or a block size.

In operation, when the core processor circuit 120 receives a reading command and needs to read data corresponding to an access address AA1, the core processor circuit 120 can read the cache memory 140 according to the access address AA1.

As Illustrated in FIG. 2, the access address AA1 includes a tag filed TAG1, an index filed INDEX, and an offset filed OFFSET. Based on the index filed INDEX, a corresponding row can be determined. Corresponding data DATA can be determined by comparing the tag filed TAG1 with tag information TAG2 in the corresponding row1. Based on the offset filed OFFSET, a corresponding bit can be determined from the corresponding data DATA.

For example, if the index filed INDEX indicates the 6th row, a comparator circuit 141 compares the tag filed TAG1 with the tag information TAG2 in the 6th row. If the tag information TAG2 of the way W1 is matched to the tag filed TAG1, a "cache hit" occurs. In other words, the data to be read is in the way W1 of the cache memory 140. Accordingly, a comparator 1411, corresponding to the way W1, of the comparator circuit 141, outputs a hit signal HIT with a logic value 1, and a buffer 1421, corresponding to the way W1, of a selector circuit 142 selects a corresponding bit in corresponding data DATA of the way W1 according to the offset filed OFFSET and output the corresponding bit to an output circuit 143. Then, the output circuit 143 outputs the corresponding bit according to the hit signal HIT with a logic value 1, to be output data DATA_OUT. Then, the core processor circuit 120 receives the output data DATA_OUT, and the reading process is finished.

If the tag information TAG2 in the 6th row is not matched to the tag filed TAG1, a "cache miss" occurs. In other words, the data to be read is not in the cache memory 140 and may be in the memory 160. Accordingly, the comparator circuit 141 outputs a hit signal HIT with a logic value 0. The output circuit 143 outputs data MEM_DATA to be read in the memory 160 according to the hit signal HIT with a logic value, to be an output data DATA_OUT. Then, the core processor circuit 120 receives the output data DATA_OUT. In addition, as shown in the above embodiments, the data MEM_DATA to be read is also written into the cache memory 140, such that the core processor circuit 120 can directly read the cache memory 140 to acquire the data in the future.

In some embodiments, the output circuit 143 is implemented by a multiplexer. It is noted that the implementations of the comparator circuit 141, the selector circuit 142, and the output circuit 143 are merely for illustration, but the present disclosure is not limited thereto.

How the data in the memory 160 is written into the cache memory 140 directly (without passing through other memory) is described in following paragraphs.

As shown in the above embodiments, one range in the memory 160 is defined by the base address information BA and the top address information TA. When a cache miss occurs and the access address AA1 is in the range, a predetermined amount of data in the memory 160 corresponding to the access address AA1 is written into the way W0 (or the way W1) of the cache memory 140.

In some embodiments, the predetermined amount of data is larger than a capacity of a cache line in the way W0. For example, the predetermined amount of data is corresponding to a page. In other words, a page of data corresponding to the access address AA1 or a page of data including data of the access address AA1 is written into the cache memory 140. The page of data may be larger than a capacity of the cache line CL0 in the way W0. For example, a page of data in the memory 160 is corresponding to 1024 bytes, and the capacity of the cache line CL0 in the way W0 merely is four bytes. In this situation, it needs 256 cache lines to store the page of data. Accordingly, a page of data from the memory 160 is written into 256 cache lines in the way W0. Data from a static random access memory (SRAM) is written into the way W2. In other words, the data from the memory 160 and the data from the SRAM are written into different ways.

In some other embodiments, if the cache memory 140 merely includes one way (for example, the way W0), a page of data from the memory 160 is written into 256 cache lines in the way W0, and data from the SRAM is written into other cache lines in the way W0. In other words, in these embodiments, the data from the memory 160 and the data from the SRAM are written into different cache lines in the same way (for example, the way W0).

In some related approaches, data to be read is written from the memory 160 (for example, the NAND flash memory) to an additional memory (for example, dynamic random access memory). Then, the data to be read is written to the cache memory 140 from this additional memory, such that the core processor circuit 120 can directly read the cache memory 140 to acquire the data in the future. However, disposing this additional memory increases cost and the circuit area. Compared to the related approaches above, in the present disclosure, the data to be read can be written into the cache memory 140 from the memory 160 (for example, the NAND flash memory) directly. Thus, without disposing the aforementioned additional memory, cost and the circuit area can be reduced. In addition, as shown in the above embodiments, in some embodiments, cost of the data write system 100 can be reduced by utilizing the NAND flash memory (the memory 160).

Figure 3:
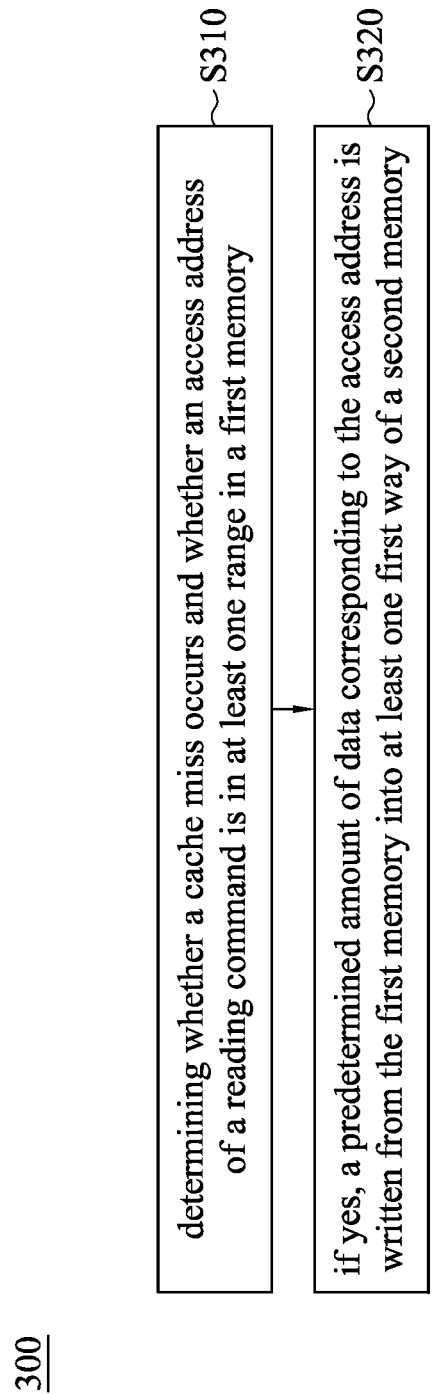
FIG. 3 is a flow diagram illustrating a data write method according to some embodiments of the present disclosure.

Reference is made to FIG. 3. FIG. 3 is a flow diagram illustrating a data write method 300 according to some embodiments of the present disclosure. The data write method 300 includes operations S310 and operation S320. The data write method 300 may be applied to the data write system 100 in FIG. 1, but the present disclosure is not limited thereto. For ease of understanding, the data write method 300 is discussed with reference to FIG. 1 and FIG. 2.

The operation S310 is for determining whether the cache miss occurs and whether the access address AA1 of the reading command is in the at least one range in the memory 160. In some embodiments, the range is defined by the base address information BA and the top address information TA. In some embodiments, the range is defined by start address information and the size information.

In operation S320, if the determination of the operation S310 is yes, the predetermined amount of data corresponding to the access address AA1 is written from the memory 160 into the way W0 of the cache memory 140, such that the core processor circuit 120 can directly read the data in the cache memory 140 in the future. In some embodiments, the predetermined amount of data is corresponding to a page, and a capacity of a page is greater than a capacity of the cache line CL0 in the way W0. Accordingly, the data is written in multiple cache lines in the way W0.

As shown in the above embodiments, the data write system and the data write method of the present disclosure do not need to dispose other memory (for example, dynamic random access memory), and thus can reduce cost and the circuit area.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script in a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A data write system, comprising:
    a processor circuit;
    a first memory coupled to the processor circuit;
    a second memory coupled to the first memory;
    a first register coupled to the processor circuit and configured to store base address information;
    a second register coupled to the processor circuit and configured to store top address information, wherein the base address information and the top address information define at least one range,
    wherein if a cache miss occurs and an access address of a reading command is in the at least one range in the second memory, a predetermined amount of data corresponding to the access address is written from the second memory into at least one first way of the first memory; and
    a third register configured to store assigning information, wherein the assigning information is configured to record a quantity of the at least one first way.

2. The data write system of claim 1, wherein at least one second way of the first memory is configured to store data from a static random access memory.

3. The data write system of claim 2, wherein a capacity of the at least one second way is different from a capacity of the at least one first way.

4. The data write system of claim 1, wherein the second memory is a flash memory.

5. The data write system of claim 1, wherein the predetermined amount of data is corresponding to a page.

6. The data write system of claim 1, wherein the predetermined amount of data is larger than a capacity of a cache line in the at least one first way.

7. The data write system of claim 6, wherein the predetermined amount of data is stored into a plurality of first cache lines in the at least one first way.

8. The data write system of claim 7, wherein at least one second cache line in the at least one first way is configured to store data from a static random access memory.

9. The data write system of claim 1, wherein a quantity of the at least one first way is equal to or larger than 2.

10. The data write system of claim 1, wherein a quantity of at least one range is equal to or larger than 2.

11. A data write method, comprising:
    storing base address information in a first register;
    storing top address information in a second register, wherein the base address information and the top address information define at least one range;
    storing assigning information into a third register;
    determining whether a cache miss occurs and whether an access address of a reading command is in the at least one range in a first memory; and
    if yes, a predetermined amount of data corresponding to the access address is written from the first memory into at least one first way of a second memory,
    wherein the assigning information is configured to record a quantity of the at least one first way.

12. The data write method of claim 11, further comprising:
    storing data from a static random access memory into at least one second way of the second memory.

13. The data write method of claim 12, wherein a capacity of a cache line in the at least one second way is different from a capacity of a cache line in the at least one first way.

14. The data write method of claim 11, wherein the first memory is a flash memory.

15. The data write method of claim 11, wherein the predetermined amount of data is corresponding to a page.

16. The data write method of claim 11, wherein the predetermined amount of data is larger than a capacity of a cache line in the at least one first way.

17. The data write method of claim 16, further comprising:
    storing the predetermined amount of data into a plurality of first cache lines in the at least one first way.

18. The data write method of claim 17, further comprising:
   storing data from a static random access memory into at least one second cache line in the at least one first way.

* * * * *